United States Patent [19]

Hastings

[11] E Re. 29,457

[45] Reissued Oct. 25, 1977

[54] FUEL CONTROL MEANS FOR BURNERS

[75] Inventor: Thomas C. Hastings, Willowdale, Canada

[73] Assignee: The Coleman Company, Inc., Wichita, Kans.

[21] Appl. No.: 671,284

[22] Filed: Mar. 29, 1976

Related U.S. Patent Documents

Reissue of:

[64] Patent No.: 3,807,938
Issued: Apr. 30, 1974
Appl. No.: 378,710
Filed: July 12, 1973

[51] Int. Cl.[2] ..... F23D 11/38; F23D 13/28

[52] U.S. Cl. ..... 431/123; 126/38; 431/107

[58] Field of Search ..... 431/123, 210, 247, 107; 126/38, 44

[56] References Cited

U.S. PATENT DOCUMENTS

| | | | |
|---|---|---|---|
| 1,686,348 | 10/1928 | Schmidt | 431/123 |
| 3,485,567 | 12/1969 | Hutchinson et al. | 126/38 X |
| 3,687,125 | 8/1972 | Weimer | 126/38 |

*Primary Examiner*—Edward G. Favors

[57] ABSTRACT

A fuel control means is provided for supplying vaporized fuel to burners such as gasoline lanterns and camp stoves. The control means includes fuel and pressurized air conduits which extend from the fuel tank of the burner toward the burning means and which provide inlet and outlet orifices. Inlet orifice restricting means and outlet orifice restricting or cleaning means are movably mounted within the conduit, and a valve member is movably mounted within the conduit to open and close the fuel passage therethrough. A single control member is operatively connected to each of the orifice restricting means and to the valve member, and the single control member is movable between a first position in which the outlet restricting means is positioned in the outlet orifice to clean the same, a second position in which the valve member is maintained open and the inlet restricting means is positioned in the inlet orifice to permit air mixed with fuel to flow from the tank through the conduit, and a third position in which the valve member is maintained open and the inlet restricting means is positioned out of the fuel inlet to prevent air from flowing into the conduit with the fuel.

8 Claims, 18 Drawing Figures

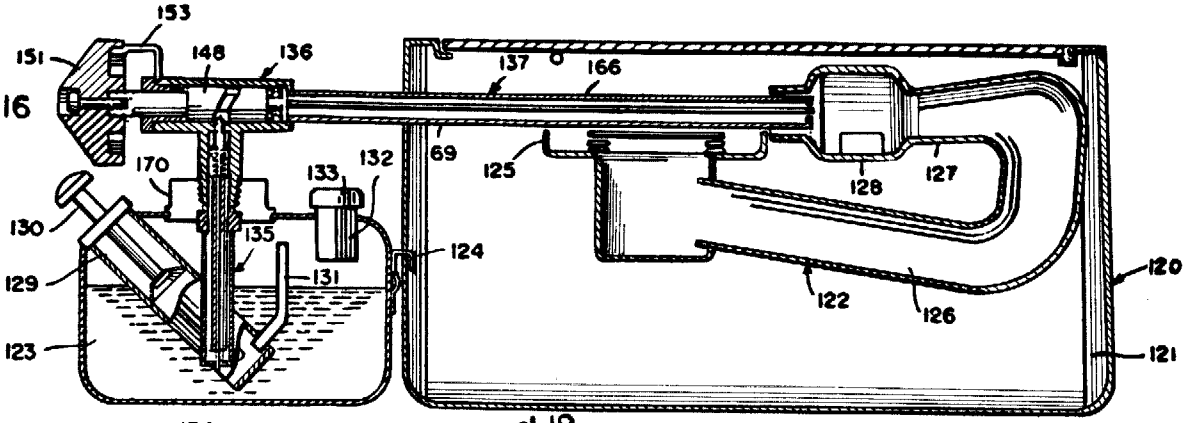
FIG. 16
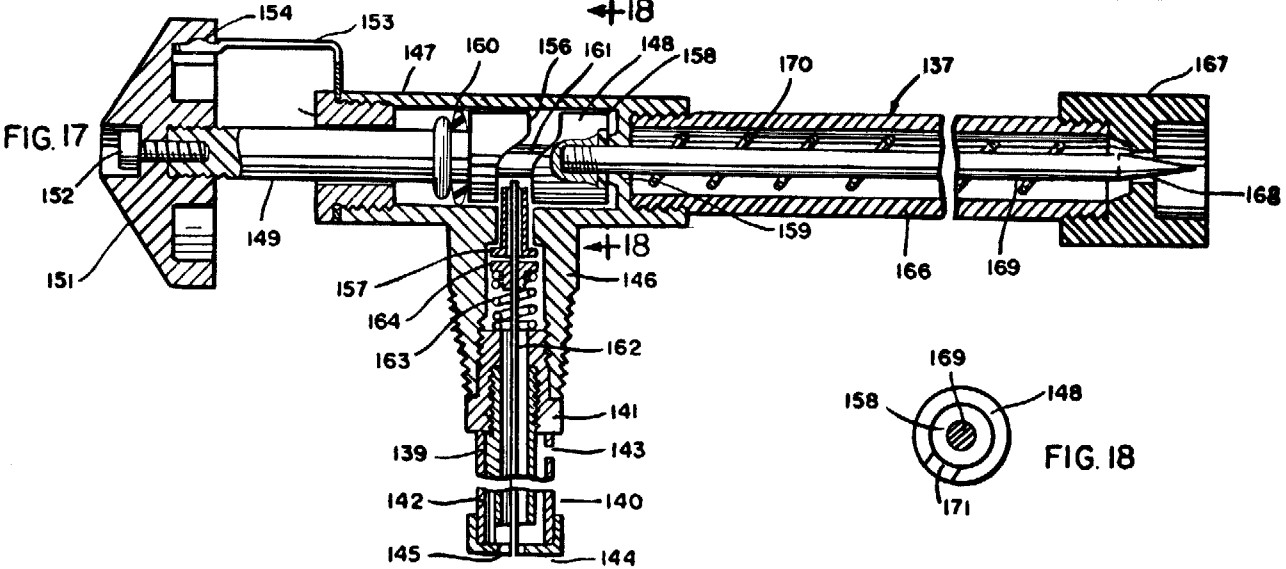
FIG. 17
FIG. 18

FUEL CONTROL MEANS FOR BURNERS

Matter enclosed in heavy brackets [ ] appears in the original patent but forms no part of this reissue specification; matter printed in italics indicates the additions made by reissue.

This invention relates to vaporized fuel burners such as gasoline lanterns and camp stoves and, more particularly, to a vaporized fuel burner which is provided with a single control member for operating the fuel flow valve, the orifice cleaner, and the inlet restricting member.

Vaporized fuel burners such as lanterns and camp stoves generally include a fuel tank, a fuel conduit including a generator tube, and burning means which is supplied with a mixture of fuel from the conduit and air. The generator tube is positioned adjacent the burning means so that fuel passing through the generator tube is vaporized, and a valve is interposed in the fuel conduit to open and close the fuel passage therethrough. A cleaner rod is usually mounted within the generator tube and is movable into and out of the discharge orifice of the generator to clean the orifice and, if desired, to regulate the flow of fuel therethrough. When the burning means is to be lighted and before the generator tube is heated sufficiently to vaporize the fuel, a restricting rod is used to restrict the flow of fuel into a chamber below a fuel tube to permit air to flow through the chamber and become entrained with the fuel passing into the fuel tube. This rod is removed from the fuel inlet when the generator is heated sufficiently to vaporize the fuel.

Heretofore, the shut off valve and the inlet restricting rod of a gasoline lantern have generally been operated by one control member, and a separate control member has been used to operate the cleaner rod for the generator orifice. Since the control member for the cleaner rod was not operatively connected to the control member for the shut off valve, the operator might forget to actuate the cleaner rod before lighting the lantern, and the lantern might not operate at peak efficiency because of dirt, carbon, or other foreign material in the generator orifice. Optimum performance of the lantern is obtained by first actuating the cleaner rod to clean the generator orifice and then operating the shut off valve and the inlet restrictor to permit lighting of the lantern.

In prior camp stoves the cleaner rod and the shut off valve are generally operated by the same control member, but a separate control member or lighting lever is provided for the inlet restricting means. If the burner is lighted without operating the inlet restricting means, the fuel will generally burn with a poor smokey flame that can rise to abnormal heights and can fail to heat the generator adequately. If the inlet restricting means is actuated when the burner is lighted but is not reset after the generator tube is heated, the pressurized air within the fuel tank will be rapidly depleted and the fuel mixture supplied to the burner will be excessively lean. Thus, for optimum performance of the camp stove, both a lighting lever for the restricting rod and the shut off valve must be operated individually and in a properly coordinated manner to achieve proper and safe lighting and operation.

Thus, with both lanterns and camp stoves, two control members must be separately operated in a coordinated manner, and improper operation can cause malfunction and safety hazards. Also, some operators worry about operating the separate control members in the proper sequence, and this state of mind can itself contribute to improper performance or a safety hazard.

The fear of correctly operating a potentially explosive device may be particularly great in persons such as housewives who have little or no experience in operating camping equipment.

The invention provides a vaporized fuel control means in which a single control member actuates the shut off valve, the generator orifice cleaning rod, and the inlet restricter in the proper sequence. The single control knob is rotatable in one direction from an off position to a light position to a run position. The fuel control means insures that the generator orifice will be cleaned before the burner is lighted and that the inlet restricter is in the proper position for optimum lighting when the shut off valve is opened to the light position. When the generator is heated sufficiently to vaporize the fuel passing therethrough, the control knob is turned to move the valve to the run position, and the inlet restrictor is automatically moved out of the inlet orifice. When the control member is turned to the off position to close the valve, the cleaner rod is again passed into the generator orifice to clean the orifice. All of the foregoing operations are performed automatically merely by rotating the control knob from one position to another, and the operator need not worry about coordinating the movements of separate control members. Also, the various operating positions of the control knob are clearly delineated, both visually and tactilely, and the operator need not worry whether the components of the control system are in the proper positions relative to each other. Since only a single control member is used, the number of parts required can be reduced, the packing gland for a second control member is eliminated, and a potential area for fuel leakage is eliminated.

The invention will be explained in conjunction with illustrative embodiments in the accompanying drawing, in which FIG. 1 is a sectional elevational view of a gasoline lantern equipped with a fuel control system formed in accordance with the invention;

FIG. 16 is a sectional elevational view of a camp stove equipped with a fuel control system formed in accordance with the invention;

FIG. 17 is an enlarged fragmentary view of a portion of FIG. 17; and

FIG. 18 is a fragmentary sectional view taken along the line 18—18 of FIG. 17.

Figure 1:
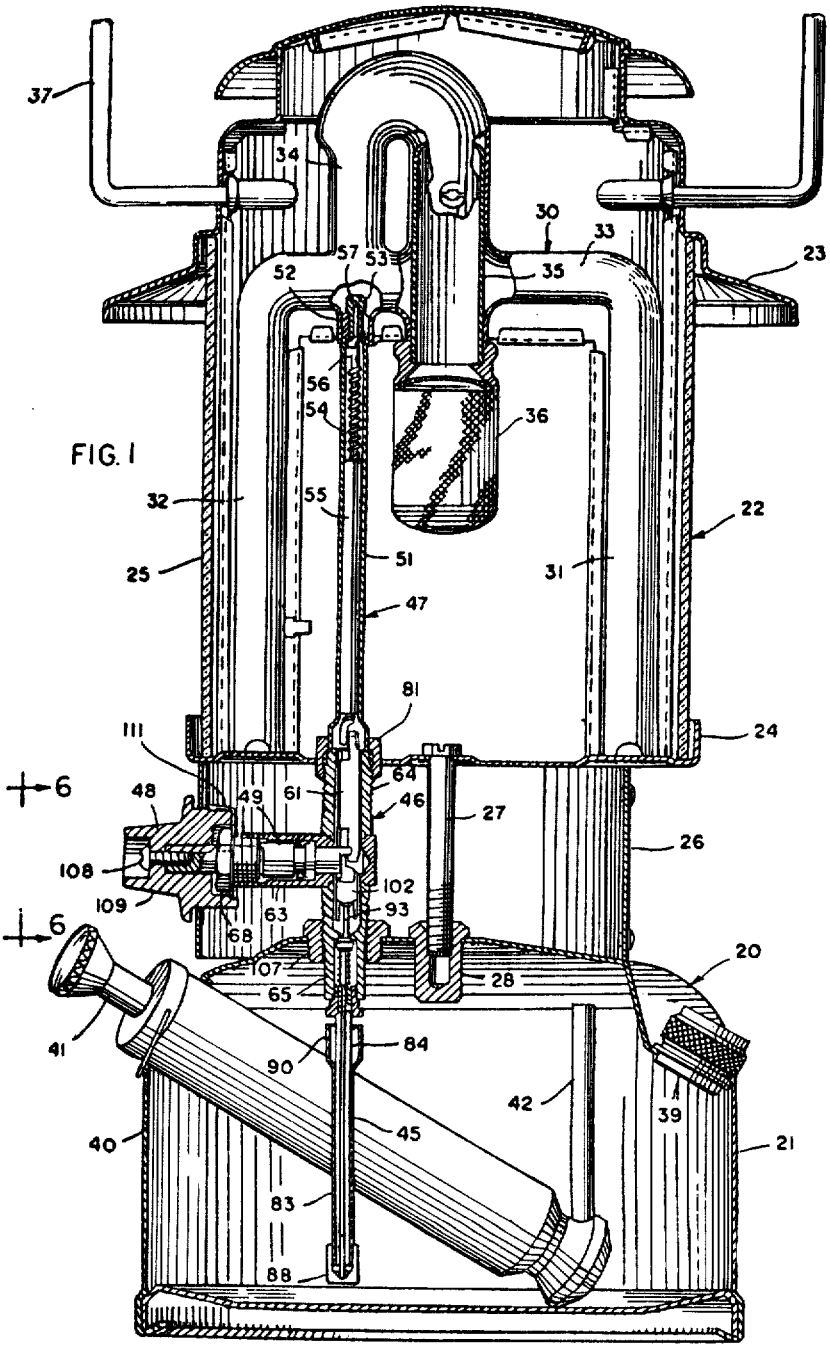

Referring now to FIG. 1, the numeral 20 designates generally a gasoline lantern which includes a fount or fuel tank 21, a globe assembly 22, and a ventilator 23. The globe assembly includes a support base 24 and a cylindrical glass globe 25. The base 24 is supported above the fount by a cylindrical collar 26 and is secured to the base by bolt 27 and a tapped fitting 28. A burner assembly 30 is positioned within the globe and secured to the base. The burner assembly includes a pair of air tubes which extend upwardly from the base and which communicate with the exterior of the lantern, connecting tube 33 which extends between the upper ends of the air tubes, a generally U-shaped venturi tube 34, a burner tube 35, and a mantle 36. The ventilator 23 is secured to the burner assembly by a bail or handle 37.

The tank is provided with a filler spout 39 which permits the fount to be filled with fuel up to the spout so that an air space remains between the level of the fuel and the top of the tank. The tank is pressurized by a manual air pump 40 which includes a plunger 41 and an outlet pipe 42 which extends upwardly into the air space above the level of the fuel.

The foregoing parts are conventional, and a detailed description thereof is unnecessary.

Fuel is conducted from the tank to the burner assembly by means of a fuel tube assembly 45, a valve assembly 46, and a generator assembly 47. These three assemblies are interconnected and provide a fuel conduit or flow passage for the fuel as will be described hereinafter. A single control knob 48 extends through an opening in the collar 26 and is secured to a shaft 49 which is rotatably mounted within the valve assembly 46.

The generator assembly 47 includes a generator tube 51, a generally cylindrical bushing 52 which is mounted on the upper end of the tube, and a gas tip 53 which is mounted within the bushing and which is provided with a fuel outlet orifice through which fuel passes from the generator to the burner assembly. A wire helix 54 and an asbestos tube or packing 55 are positioned within the generator tube, and a cleaner rod 56 is reciprocably mounted within the wire helix. A cleaner needle 57 is mounted on the upper end of the cleaner rod 56 and is sized to fit relatively snugly within the orifice of the generator assembly when the cleaner rod is reciprocated upwardly to remove carbon and other material from the orifice. Since the relationship between the generator orifice and the cleaner needle is well-known, these parts need not be described in detail. The lower end of the generator rod includes a connecting portion 59 (FIG. 2) which extends perpendicularly to the axis of the generator tube and which is received by an opening 60 (FIG. 5) of a cam follower block or yoke 61 which is provided as part of the valve assembly 46.

The valve assembly 46 includes a shaft housing 63 and upper and lower bushings 64 and 65 which extend perpendicularly to the shaft housing and which are secured thereto, as by silver soldering at 66 and 67, respectively. Alternatively, the assembly could comprise a single piece forging. The outer end of the control shaft 49 is rotatably supported by a nut 68 (FIG. 1) which is threadedly engaged with the outer end of the shaft housing, and the inner end of the shaft includes a cylindrical bearing portion 69 (FIG. 2) which is rotatably supported within a reduced diameter portion 70 of the shaft housing. The shaft is provided with an annular groove 71, and an O-ring 72 positioned within the annular groove provides a gas-tight seal between the shaft and the shaft housing.

Figure 3:
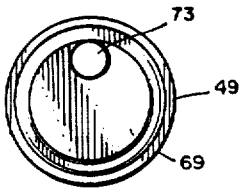
FIG. 3 is an end view of the control shaft as would be seen along the line 3—3 of FIG. 2.
Figure 4:
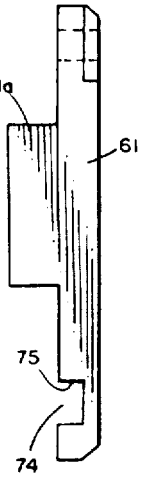
FIG. 4 is a reduced view of the upper cam follower of FIG. 2.

A projection or cam 73 extends from the inner end of the bearing portion 69 (see also FIG. 3), and the cam is offset or eccentrically mounted with respect to the axis of the shaft. In the position illustrated in FIG. 2 the cam 73 is positioned within a cam follower groove 74 (FIGS. 4 and 5) in the cam follower block 61.

Figure 5:
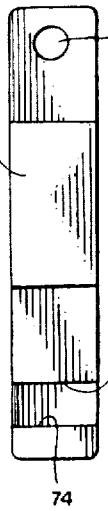
FIG. 5 is a side view of the cam follower of FIG. 4.

Referring now to FIG. 5, as the eccentrically mounted cam 73 rotates through the cam follower groove 74 from the right side of the block 61 to the left, the cam follower block will be forced upwardly as the cam engages the camming surface 75, and will be returned to its original position as the cam moves beyond the high point of its travel and continues to rotate counterclockwise. Conversely, when the shaft is rotated clockwise as viewed in FIG. 5, the cam follower block will be forced upwardly as the cam engages the camming surface 75 and will move downwardly as the cam passes the high point of its arc of travel. The amount of eccentricity of the cam 73, i.e., the radial distance from the axis of the shaft 49, is such that the cleaning needle 57 at the top of the cleaner rod 59 will be reciprocated from a lower position in which the needle is spaced below the generator orifice and does not restrict fuel flow through the orifice, and a raised position in which the needle passes through the orifice.

Figure 2:
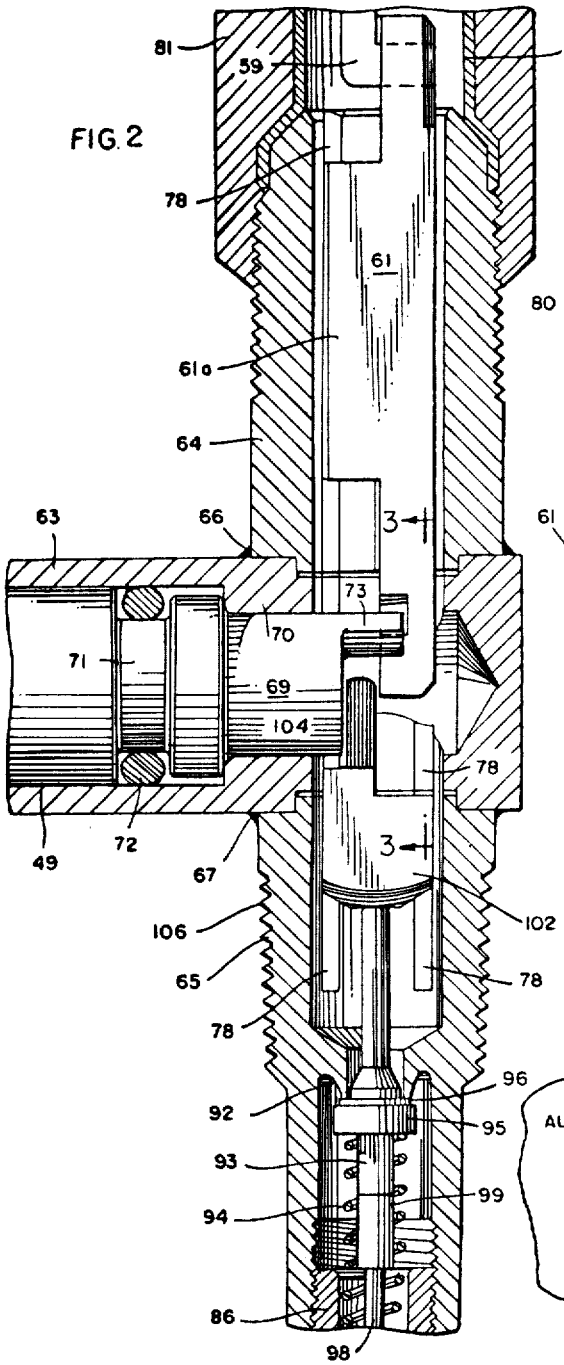
FIG. 2 is an enlarged fragmentary view of a portion of FIG. 1.

The cam follower block 61 is guided for vertical reciprocal movement by four grooves 78 (two of which are shown in FIG. 2) which are formed in the wall of the otherwise cylindrical vertically extending bore through the upper and lower bushings 64 and the shaft housing 63. The central portion 61a of the cam follower block 61 has a square transverse cross-section, and the corners of the central portion are sized to be slidably received in the grooves 78.

The upper portion of the upper bushing 64 is provided with external threads 80, and the bottom of the generator tube is secured to the bushing by a nut 81 which is threadedly engaged with the bushing.

Figure 11:
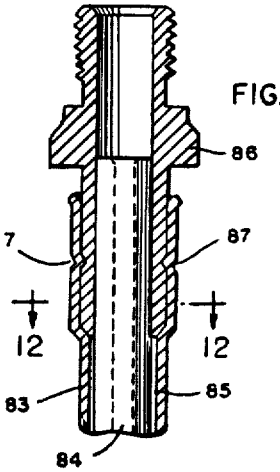
FIG. 11 is a sectional view of the inlet tube assembly taken along the line 11—11 of FIG. 10.

Referring now to FIGS. 10–15, the fuel tube assembly 45 includes an outer tube 83 and an inner tube 84 concentrically mounted within the outer tube and having an outer diameter less than the inner diameter of the outer tube to provide an annular chamber 85. The upper end of the inner tube 84 is secured within a generally cylindrical upper bushing 86, and the upper end of the outer tube 84 is clinched to the outside of the upper bushing at two diametrically opposed locations 87 (FIG. 11). The securement of the inner and outer tubes to the bushing 86 maintains the spaced relationship therebetween, and a lower bushing 88 is snugly fitted over the lower end of the outer tube and soldered thereto at 89. The inside wall of the lower bushing extends below the lower ends of the inner and outer tubes, and the bushing and the outer tube act as casing means around the inner fuel tube to provide the chamber 85. A fuel inlet orifice 89 is provided through the bottom of the bushing in alignment with the axis of the inner tube 84.

The upper end of the chamber 85 between the inner and outer tubes is provided with air entry ports by diametrically opposed grooves or channels 90 which are formed in the wall of the outer tube and which permit air to pass from outside of the fuel tube assembly into the chamber. The grooves 90 are each spaced 90° from the clinched portions of 87 of the outer tube.

As can be seen in FIG. 2, the externally threaded upper end of the bushing 86 is threadedly engaged with the internally threaded lower end of the bushing 65 of the valve assembly. An annular valve seat 92 is formed on the inside of the bushing 65, and a valve closure member or valve core 93 is resiliently biased against the valve seat 92 by a helical coil spring 94. The valve core includes a radially enlarged central portion 95 which carries a compressible, resilient valve seat 96 which is engageable with the valve seat 92 to close the fuel passage through the bushing 65. The coil spring 94 is compressed between the enlarged portion 95 of the valve core and the upper end of the inner tube 84 of the fuel tube assembly.

An elongated inlet-restricting rod 98 is connected to the lower end of the valve core by a connecting sleeve 99 and extends downwardly through the inner tube 84 and the fuel inlet orifice 89 at the bottom of the fuel tube assembly. The diameter of the rod 98 relative to the inside diameter of the inner tube 84 is such that fuel can flow freely upwardly through the tube without interference from the rod. An axial portion 99 of the rod adjacent the lower end thereof is provided with a reduced diameter or thickness, and the narrow portion 99 of the rod is separated from the lower end by a restricting end portion 100 having a diameter equal to that of the remainder of the rod.

Figure 13:
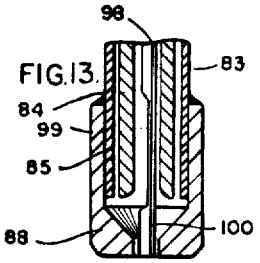
FIG. 13 is an enlarged sectional view of the bottom of the fuel inlet tube assembly showing the inlet restricting rod in one position.

When the valve core 93 is maintained in the closed position illustrated in FIG. 2 by the spring 94, the lower end of the rod 98 is positioned adjacent the lower end of the bushing 88 as shown in FIG. 13. In this position the restricting end portion 100 is positioned within the fuel inlet orifice 89.

Figure 8:
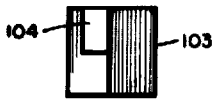
FIG. 8 is a top view of the cam follower of FIG. 7.
Figure 9:
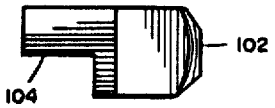
FIG. 9 is a side view of the cam follower of FIG. 8.
Figure 7:
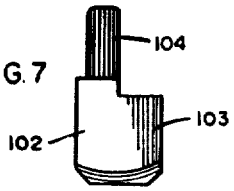
FIG. 7 is a view of the lower cam follower of FIG. 2.
Figure 12:
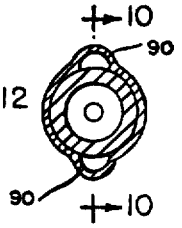
FIG. 12 is a view taken along the line 12—12 of FIG. 11.
Figure 10:
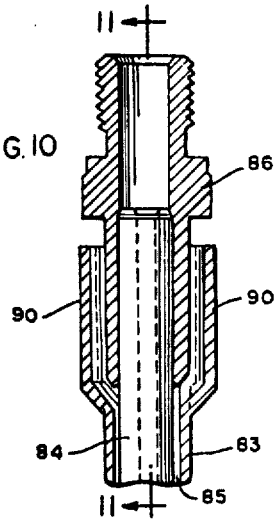
FIG. 10 is an enlarged fragmentary view of the upper end of the fuel inlet tube assembly.

A cam follower block 102 rides on the upper end of the valve core 93 (FIG. 2), and, as can be seen in FIGS. 7–9, the block is provided with a square cross-section sized so that the corners are slidably received by the guide grooves 78 formed in the valve assembly. The cam follower 102 includes a generally cubic body 103 which is supported by the upper end of the valve core and an upwardly extending cam-engaging projection 104 adjacent one corner of the body. As viewed in FIGS. 2 and 7, the cam-engaging projection 104 extends upwardly adjacent the rear left hand corner of the body.

The upper end of the bushing 65 of the valve assembly provided with external threads 106 (FIG. 2), and the valve assembly is secured to the tank by a nut 107 (FIG. 1) which is threadedly engaged with the threads 106.

Figure 6:
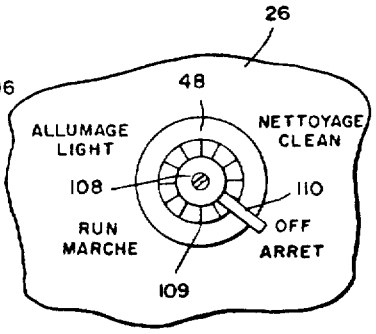
FIG. 6 is a fragmentary view taken along the line 6—6 showing the operating positions of the control knob.

The control knob 48 is non-rotatably mounted on the shaft 49 as by a splined connection or the like, and the knob is secured to the shaft by a screw 108 (FIGS. 1 and 6). The knob is provided with a frusto-conical grooved or serrated gripping surface 109, and an indicating lug or pointer 110 extends radially outwardly beyond the outer circumference of the knob and cooperates with markings on the collar 26 to inform the operator of the position of the control knob and the various components of the fuel control system. A detent spring 111 (FIG. 1) is secured between the nut 68 and the shaft casing 63 and extends radially outwardly over the outer periphery of the control knob. The outer end of the detent spring carries a ball which is receivable in sockets formed in the outer periphery of the knob to provide a tactile or detent feel when the knob is rotated into the various operating positions.

Figure 15:
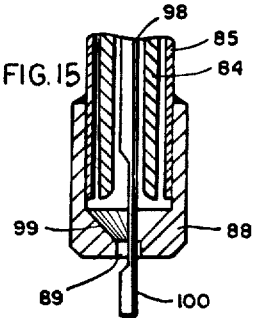
FIG. 15 is a view similar to FIGS. 13 and 14 showing the inlet restricting rod in still another position.

The lantern is used by filling the tank with appropriate fuel, such as gasoline, through the filler spout 39. The spout is then capped, and the air space above the fuel level is pressurized by means of the hand pump 40. The tank is filled and pressurized when the fuel control assembly is in the off or closed position. In this position, the cam 73 of the control shaft 49 is positioned to the right of the camming surface 75 of the cam block 61 as viewed in FIG. 5, and the spring 94 maintains the valve core 93 in the closed position illustrated in FIG. 2. In this position the restricting end portion 100 of the rod 98 is positioned in the fuel inlet orifice 89 as illustrated in FIG. 13. The diameter of the restricting end portion 11 is slightly less than the diameter of the inlet orifice, and fuel can flow through the inlet orifice when the restricting end portion is maintained therein but at a substantially reduced rate compared to the rate at which fuel can flow through the inlet orifice when the reduced portion 99 is positioned in the orifice as illustrated in FIG. 15. The upper end of the outer tube 83 is positioned above the fuel spout 39 and therefore above the level of the fuel, but fuel will flow into the chamber 85 between the inner and outer tubes through the restricted annular opening between the restricted end portion 100 and the wall of the inlet orifice. When the lantern is in the off position, the air pressure above the fuel is the same both inside and outside of the chamber 85 by virtue of the grooves 90 formed in the upper end of the outer tube. Fuel is forced upwardly through the inner tube by the air pressure but is prevented from passing upwardly beyond the valve seat by the valve core.

Figure 14:
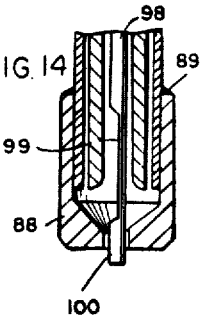
FIG. 14 is a view similar to FIG. 13 showing the inlet restriction rod in another position.

When the lantern is to be lighted, the control knob 48 is rotated counterclockwise from the off position (FIG. 6) about 180° to the light position. As the control knob and the control shaft 49 are rotated, the cam 73 engages the camming surface 75 of the cam follower block 61 and moves the cleaning needle 57 carried by the upper end of the cleaner rod 59 upwardly through the generator orifice to clean the orifice. As the cam 73 continues to rotate to the light position, the cam follower block 61 is returned to its original position in which the cleaner needle is spaced below the generator orifice. Just prior to reaching the light position, the cam 73 engages the projection 104 on the cam follower block 102. As the cam 73 moves to the light position, the cam follower block 102 and the valve core 93 are depressed to move the valve closure 96 away from the valve seat 92 to open the fuel passage through the valve assembly. The fuel restricting rod 98 is also depressed, but the amount that the valve core and rod are depressed when the control shaft 49 is in the light position and the axial dimension of the restricting end portion of the rod are such that the restricting end portion of the rod is still maintained within the fuel inlet orifice as shown in FIG. 14.

The restricting end portion therefore restricts the flow of fuel into the chamber 85 through the inlet orifice, and the pressure within the chamber 85 forces fuel from the chamber up through the inner tube past the open valve faster than fuel can flow through the inlet orifice. The level of the fuel within the chamber 85 will drop below the lower end of the inner tube 84, and some air from the chamber 85 will become entrained with fuel and pass upwardly through the inner tube 84. The liquid fuel and air passes upwardly through the valve assembly 46 and the generator assembly 47 and issues from the generator orifice as an atomized spray. This mixture then passes through the venturi 34 where it aspirates additional combustion air supplied to the throat of the venturi by the air tubes 31 and 32. The fuel and air mixture passes through the burner tube 35 and into the mantle 36 where it is ignited by a match or the like held adjacent to the mantle.

The fuel and air mixture supplied to the mantle burns in a controlled and limited manner, and heat from this combustion is exchanged through the generator assembly 47 to the fuel flowing through the generator. When the generator is heated, the fuel is converted from a liquid to a vapor state, and the generator is usually sufficiently heated in about 30 seconds. The wire helix 54 and asbestos packing 55 within the generator diffuses heat transmission to the fuel and dampens variations in vaporization rate to prevent excessive flickering of the light.

When the generator converts the fuel into the vapor state, the mantle begins to burn with a brilliant incandescence, and the control knob is then rotated counterclockwise from the light position to the run position. Further rotation of the control shaft 49 and the cam 73 from the light position causes further depression of the cam follower block 102, the valve core 93, and the rod 98, and when the control knob is brought to the run position, the reduced portion 99 of the rod 98 is positioned within the inlet orifice as shown in FIG. 15. The fuel flow rate through the orifce is thereby increased sufficiently to cause the level of the fuel in the chamber 85 to rise above the lower end of the inner tube 84, and air from the chamber 85 no longer becomes entrained in the fuel that is forced upwardly through the inner tube 84. As the liquid fuel passes upwardly through the heated generator assembly 47, it is vaporized, and the gas vapor issues from the generator orifice at high energy and entrains and mixes with air as it passes through the venturi to produce the optimum flame at the mantle.

When the lantern is to be turned off, the control knob is rotated clockwise directly from the run position to the off position. As the control shaft 49 and the cam 73 pass slightly beyond the light position, the valve closure 96 seats against the valve seat 92 to shut off further fuel flow. As the control shaft and the cam continue to rotate clockwise to the off position, the cam engages the camming surface 75 of the cam follower block to force the cleaning needle into the generator orifice to clean the orifice. The generator needle returns to the lowered position as the cam 73 rotates clockwise beyond its high position to the off position. Since the cleaner needle is out of the generator orifice when the knob has been returned to the off position, the generator will be purged of fuel, and this will insure optimum lighting upon the next use. Further, the purging of the generator provides a dwell period of operation of approximately 1 minute after the control knob is turned to the off position during which the light slowly dies. This provides an advantage to campers and the like who must find their way to bed after shutting off the lantern.

The restricting end portion 100 of the rod 98 is returned by spring 94 to its original position illustrated in FIG. 13 in which it is positioned within the inlet orifice. This insures that the restricting end portion will be positioned in the orifice as soon as the lantern is turned on and the valve is opened to provide air entrainment from the chamber 85. Thus, a timid operator who is slow or inaccurate in advancing the control knob from the off position to the light position will not create a hazard by opening the valve without correct air entrainment which might cause flooding, failure to gain generation, sooting of the internal components and possible fire hazards.

The sequence of the various operating positions follows the logical sequence of off, light, and run. The off and run positions are at either end of the allowable rotation of the control knob, the rotational limits being provided by engagement of a key on the control shaft 49 and a projection on the shaft casing 63. The off, run and light positions are also detented by means of the spring 111. A detent is not provided for the clean position since the operator rotates the knob directly from the off position to the light position. However, the control shaft passes through the clean position as it rotates between the off and light positions, and cleaning of the orifice is accomplished automatically without thought on the part of the operator.

The invention will now be explained in conjunction with a camp stove 120 illustrated in FIGS. 16 and 17. The camp stove includes a conventional burner housing or stove box 121 which supports a burner assembly 122, and a fuel tank 123 which is secured to the stove box by brackets 124. The burner assembly includes a burner 125 which is supplied with a mixture of fuel and air by a pipe 126 which is connected to a venturi tube 127 and an air opening 128.

The fuel tank 123 is equipped with a manual pump 129 which includes a plunger 130 and an air outlet pipe 131 which extends upwardly above the level of the fuel within the tank. The tank may be filled through a spout 132 which is convered with a removable cap 133.

Fuel is conducted from the tank to the burner assembly by means of a fuel tube assembly 135, a valve assembly 136, and a generator assembly 137. These three assemblies are interconnected and provide a fuel conduit or flow passage for the fuel as will be described hereinafter.

Referring to FIG. 17, the fuel tube assembly 135 includes inner and outer vertically extending tubes 139 and 140, respectively, both of which are secured to a bushing 141. The inner tube 139 is threadedly engaged with internal threads on the bushing, and the outer tube 140 is suitably secured, as by silver soldering, to the bottom of the bushing.

An annular chamber 142 is defined between the inner and outer tubes and below the inner tube, and the chamber communicates with the air space above the fuel level in the tank by means of an air port 143. The outer tube extends below the bottom of the inner tube, and a cap 144 is secured to the bottom of the outer tube and is provided with a fuel inlet orifice 145.

The bushing 141 is threadedly engaged with a downwardly extending bushing 146 which is provided as part of a generally T-shaped valve housing 147. A generally cylindrical valve core 148 is rotatably mounted within the housing 147, and a shaft 149 secured to the valve core extends rotatably through a nut 150 which is threadedly engaged with the valve housing. A control knob 151 is non-rotatably mounted on the shaft 149 and secured by screw 152. A detent spring 153 is secured between the valve housing and the nut 150 and extends axially toward the control knob. The outer end of the detent spring carries a lug or projection which is receivable in sockets 154 formed on the inner surface of the peripheral wall of the knob at each of the operating locations of the knob.

The valve core 148 is provided with a cam groove 156 which receives a hollow guide pin 157 which extends upwardly from the bushing 146 into the longitudinal bore of the valve housing. A compressible, resilient annular sealing member 158 is carried by the forward end of the valve core 148 and is engageable with an annular valve seat 159 formed in the forward wall of the valve housing. As the valve core is rotated by the control knob, the engagement of the side walls of the camming groove 156 with the guide pin 157 moves the valve core 148 axially within the valve housing toward and away from the valve seat 159. The valve is closed in the position illustrated in FIG. 17, and counterclockwise rotation of the knob will cause the valve core to move axially to the left to open the valve and to permit fuel to flow between the valve core and the valve housing into the generator assembly. Fuel is prevented from escaping from the valve housing by an O-ring 160 which is received in an annular groove formed in the rear of the valve core.

The camming groove 156 terminates in an axially extending camming surface 161 which is eccentric relative to the axis of the shaft 149 and the valve core 148, i.e., the distance of the camming surface 161 from the axis of the shaft varies around the circumference of the camming groove. The upper end of a restricting rod 162 is resiliently urged against the camming surface 161 by a coil spring 163. The coil spring is compressed between the upper end of bushing 141 and an annular washer 164 which is secured to the rod 162. In the position illustrated in FIG. 17, the radial dimension of the camming groove 161 and the length of the restricting rod 162 is such that the lower end of the rod is positioned in the fuel inlet orifice 145.

The generator assembly 137 includes a generator tube 166 which is threadedly secured to the valve housing 147, and a gas tip 167 which is secured to the end of the generator tube and which is provided with a generator orifice 168. A cleaner rod 169 extends through the generator tube and is threadedly engaged with the valve core 148. The outer end of the cleaner rod tapers to a point, and in the position illustrated in FIG. 17, the pointed end of the cleaner rod extends completely through the orifice 168. A wire helix 169 is positioned within the generator tube to facilitate heat transfer from the wall of the generator tube to the fuel passing therethrough.

The valve assembly is secured to the fuel tank by the bushing 146 and an internally threaded bushing 170 which is mounted on the tank.

When the camp stove is to be lighted, the operating knob 151 and the shaft 149 are rotated approximately 90° counterclockwise to the light position. Rotation of the valve core and the camming groove 156 causes the valve core to move to the left in FIG. 2. This opens the valve and extracts the needle tip of the cleaner rod from the generator orifice 168, thereby providing free fluid passage from the tank through the generator orifice.

In operation the fuel in the tank is pressurized by the hand pump 129, and fuel is forced upwardly through the inner tube 139. The valve is closed in the position illustrated in FIG. 17, and fuel is prevented from flowing into the generator. The stove is lighted by rotating the control knob 151 about 90° counterclockwise to move the valve seal 158 away from the seat 159 and to completely withdraw the cleaner rod from the generator orifice. The contour of the camming surface 161 does not change through the initial 90° of rotation, and the restricting rod 162 remains positioned in the inlet orifice 145.

As described previously with respect to the lantern, the restricting rod creates a pressure drop that is slightly greater than the gravitional pressure of the fuel as determined by the vertical height between the level of the fuel in the tank and the inlet orifice, and fuel enters the inlet orifice at a slower rate than fuel is forced into the inner tube by the pressurized air. The level of the fuel in the chamber 142 therefore drops below the lower end of the inner tube, and air in the chamber 142 entrains with the fuel which enters the chamber through the inlet orifice. The mixture of fuel and air passes upwardly through the inner tube, through the valve housing and the generator tube, and issues from the generator orifice as an atomized spray of air, gasoline droplets, and gasoline vapor. This mixture passes into the venturi to the burner where it aspirates additional air from the air opening 128 and flows to the burner where it is ignited by a match or suitable ignition device. The heat of the flame on the burner brings the generator tube to a temperature in excess of the fuel vaporizing temperature (final boiling point) of the fuel after approximately 60 seconds, and this is evidenced by the fuel burning as a hard blue flame.

When the generator has been heated sufficiently, the operator turns the control knob counterclockwise from the light position approximately 30° to the run or high position which is indicated by markings on the knob and by the detent action of the spring 153. The configuration of the camming groove 156 is such that the valve core 148 does not move axially as the valve core rotates from the light position to the high position, and the cleaner needle 169 remains fully withdrawn from the generator orifice, allowing fuel to issue from the generator at full throttle. The configuration of the camming surface 161, however, is such that the restricting rod 162 is allowed to move upwardly as the valve core rotates from the light position to the high position to remove the lower end of the restricting rod from the inlet orifice, thereby allowing liquid fuel to be forced up the inner tube 139 without air entrainment.

The configuration of the camming surface 161 is such that the continued counterclockwise rotation beyond the high position does not change the position of the restricting rod 162. However, the configuration of the camming groove 156 is such that continued counterclockwise rotation of the valve core beyond the high position will cause the valve core and cleaner rod to move to the right. This gradually moves the tapered end of the cleaner rod into the generator orifice to allow a gradual throttling of the fuel from a high position to a low position through a rotation of about 60° of the control knob.

Counterclockwise rotation beyond the low position is prevented by a stop or lug on the control knob which is engageable with the detent spring 153. However, removal of the control knob and the nut 150 permits additional counterclockwise rotation of the valve core until a slot 171 (FIG. 18) in the forward end of the valve core is aligned with the guide pin 157. This permits the valve core to slide rearwardly out of the valve housing for replacement or maintenance. The slot also provides a fuel path between the opening for the guide pin and the valve seat 159.

The camming surface 161 is configured to maintain the restricting rod 162 in the inlet orifice at all positions of the control knob between the off and light position. This insures that air will be entrained with fuel at any position of the knob between the off and light positions even if the knob is not turned completely to the light position or is turned cautiously and slowly from the off position to the light position.

While in the foregoing specification a detailed description of specific embodiments of the invention were set forth for the purpose of illustration, it is to be understood that many of the details herein given may be varied considerably by those skilled in the art without departing from the spirit and scope of the invention.

The embodiments of the invention in which an exclusive property or privilege is claimed is defined as follows:

[1. In a fuel burning apparatus having a fuel tank, fuel burning means, and means for pressurizing fuel within the fuel tank, an improved fuel control means for supplying fuel from the fuel tank to the fuel burning means comprising fuel conduit means extending from the fuel tank toward the fuel burning means, the fuel conduit means having a first end provided with a fuel inlet opening positioned within the fuel tank and a second end provided with a fuel outlet orifice for supplying fuel to the fuel burning means, inlet restricting means movable within the fuel conduit means for restricting the fuel inlet orifice of the casing means, outlet cleaning means mounted within the fuel conduit means for movement into and out of the fuel outlet orifice of the fuel conduit means, valve means within the fuel conduit means movable between a closed position in which fuel flow through the fuel conduit means is prevented and an open position in which fuel flow through the fuel conduit means is permitted, a single control member movably mounted on the apparatus, and means operably connecting the control member with the valve means, the inlet restricting means, and the outlet cleaning means, the control member being movable between a first position in which the connecting means between the control member and the outlet cleaning means maintains the outlet cleaning means in the fuel outlet orifice, a second position in which the connecting means between the control member and the valve means and the inlet retricting means maintain the valve means in the open position and maintain the inlet restricting means in the fuel inlet orifice, and a third position in which the connecting means between the control member and the valve means and the inlet restricting means maintain the valve means in the open position and maintain the inlet restricting means out of the fuel inlet orifice.]

[2. The structure of claim 1 in which the control member is movable to a fourth position in which the connecting means between the control member and the valve means and the outlet cleaning means maintain the valve means in the closed position and the outlet restricting means out of the fuel outlet orifice, the first position being between the fourth position and the second position.]

[3. The structure of claim 1 in which the control member includes a shaft rotatably mounted on the apparatus and cam means on the shaft rotatable therewith, the connecting means between the control member and the inlet restricting means including cam follower means engageable with the cam means as the shaft rotates.]

[4. The structure of claim 3 including spring means resiliently biasing the inlet restricting means toward the cam means.]

[5. The structure of claim 3 in which the connecting means between the control member and the valve means also includes said cam follower means, and spring means resiliently biasing the valve means toward the cam means into the closed position, movement of the cam follower means by the cam means causing movement of the valve means from the closed position toward the open position.]

[6. The structure of claim 3 in while the connecting means between the control member and the outlet cleaning means includes second cam follower means engageable with the cam means as the shaft rotates.]

[7. The structure of claim 6 in which the second cam follower means is engaged with the cam means only when the control member is in the first position.]

[8. The structure of claim 1 in which inlet restricting means includes a rod extending toward the fuel inlet orifice and terminating in a restricting end portion providing the inlet restricting means, a reduced portion of the rod above the restricting end portion having a thickness less than the thickness of the restricting end portion, the restricting and portion being sized relative to the fuel inlet orifice to permit pressurized fuel within the chamber to flow through the fuel conduit means faster than the pressurized fuel in the tank can flow through the inlet orifice when the restricting end portion is positioned therein, the reduced portion of the rod being sized relative to the fuel inlet orifice to permit fuel to flow through the inlet orifice when the reduced portion is positioned therein at substantially the same rate as fuel flows through the fuel conduit means, the restricting end portion of the rod being positioned in the fuel inlet orifice when the control means is in the second position and the reduced portion of the rod being positioned in the fuel inlet orifice when the control means is in the third position.]

[9. The structure of claim 8 in which the control member includes a shaft rotatably mounted on the apparatus and cam means on the shaft rotatable therewith, the connecting means between the control member and the inlet restricting means including cam follower means engageable with the cam means as the shaft rotates, the rod being movable downwardly by the cam means so that the restricting end portion thereof moves out of the fuel inlet orifice and the reduced portion thereof moves into the fuel inlet orifice as the control member moves from the second to the third positions.]

10. [The structure of claim 1 in which] *In a fuel burning apparatus having a fuel tank, fuel burning means, and means for pressurizing fuel within the fuel tank, an improved fuel control means for supplying fuel from the fuel tank to the fuel burning means comprising fuel conduit means extending from the fuel tank toward the fuel burning means, the fuel conduit means having a first end provided with a fuel inlet opening positioned within the fuel tank and a second end provided with a fuel outlet orifice for supplying fuel to the fuel burning means, inlet restricting means movable within the fuel conduit means for restricting the fuel inlet orifice of the conduit means, outlet cleaning means mounted within the fuel conduit means for movement into and out of the fuel outlet orifice of the fuel conduit means, valve means within the fuel conduit means movable between a closed position in which fuel flow*

*through the fuel conduit means is prevented and an open position in which fuel flow through the fuel conduit means is permitted, a single control member movably mounted on the apparatus, and means operably connecting the control member with the valve means, the inlet restricting means, and the outlet cleaning means, the control member being movable between a first position in which the connecting means between the control member and the outlet cleaning means maintains the outlet cleaning means in the fuel outlet orifice, a second position in which the connecting means between the control member and the valve means and the inlet restricting means maintain the valve means in the open position and maintain the inlet restricting means in the fuel inlet orifice, and a third position in which the connecting means between the control member and the valve means and the inlet restricting means maintain the valve means in the open position and maintain the inlet restricting means out of the fuel inlet orifice,* the control member [includes] *including* a shaft mounted on the apparatus for rotation between off and run positions and a cam projection extending from the shaft eccentrically with respect to the axis of rotation of the shaft, the connecting means between the control member and the valve means including a cam follower engageable by the cam projection after limited rotation of the shaft from the off position, movement of the cam follower by the cam projection causing movement of the valve means from the closed to the open position, spring means resiliently biasing the valve means toward the closed position, the connecting means between the control member and the inlet restricting means including said cam follower and the valve means, the inlet restricting means being connected to the valve means for movement therewith.

11. The structure of claim 10 in which the connecting means between the control member and the outlet cleaning means includes a second cam follower engageable by the cam projection, the outlet cleaning means being positioned out of the fuel outlet orifice when the shaft is in the off position, the cam projection being engageable with the second cam follower before the first cam follower when the shaft is rotated from the off position, movement of the second cam follower by the cam projection causing movement of the outlet cleaning means into the fuel outlet orifice.

12. The structure of claim 11 in which the cam projection moves out of engagement with the second cam follower before it engages the first cam follower as the shaft is rotated whereby the outlet cleaning means is withdrawn from the fuel outlet orifice before the valve means is moved to the open position.

*13. In a fuel burning apparatus having a fuel tank, fuel burning means, and means for pressurizing fuel within the fuel tank, an improved fuel control means for supplying fuel from the fuel tank to the fuel burning means comprising fuel conduit means extending from the fuel tank toward the fuel burning means, the fuel conduit means having a first end provided with a fuel inlet opening positioned within the fuel tank and a second end provided with a fuel outlet orifice for supplying fuel to the fuel burning means, valve means within the fuel conduit means movable between a closed position in which fuel flow through the fuel conduit means is prevented and an open position in which the fuel flow through the fuel conduit means is permitted, inlet restricting means movable within the fuel conduit means with the valve means for restricting the fuel inlet orifice of the conduit means, outlet cleaning means mounted within the fuel conduit means for movement into and out of the fuel outlet orifice of the fuel conduit means, a single control member movably mounted on the apparatus, and means operably connecting the control member with the valve means and the outlet cleaning means for moving the valve means and the inlet restricting means and the outlet cleaning means in response to movement of the control member, the control member being movable between:*

*a. a first or off position in which the connecting means maintains the outlet cleaning means out of the fuel outlet orifice and maintains the valve means in the closed position,*

*b. a second or cleaning position in which the connecting means maintains the outlet cleaning means in the fuel outlet orifice and maintains the valve means in the closed position,*

*c. a third or light position in which the connecting means maintains the outlet cleaning means out of the fuel outlet orifice and maintains the valve means in the open position and the inlet restricting means in the fuel inlet orifice, and*

*d. a fouth or run position in which the connecting means maintains the outlet cleaning means out of the fuel outlet orifice and maintains the valve means in the open position and the inlet restricting means out of the fuel inlet orifice whereby the fuel outlet orifice is cleaned by the outlet cleaning means twice during each cycle in which the control member is turned from the off position to the run position and back to the off position and whereby fuel within the fuel conduit means between the valve means and the fuel outlet orifice can escape through the fuel outlet orifice when the control member is returned to the off position.*

*14. The structure of claim 13 in which the control member includes a shaft rotatably mounted on the apparatus and cam means on the shaft rotatable therewith, the connecting means including a first cam follower connected to the outlet cleaning means and engageable with the cam means as the shaft rotates and a second cam follower between the cam means and the valve means and engageable with the cam means as the shaft rotates for moving the valve means.*

*15. The structure of claim 13 including detent means on the apparatus engageable with the control member as it moves for providing tactile indication when the control member moves into the off, light, and run positions.*

*16. In a fuel burning apparatus having a fuel tank, fuel burning means, and means for pressurizing fuel within the fuel tank, an improved fuel control means for supplying fuel from the fuel tank to the fuel burning means comprising fuel conduit means extending from the fuel tank toward the fuel burning means, the fuel conduit means having a first end provided with a fuel inlet opening positioned within the fuel tank and a second end provided with a fuel outlet orifice for supplying fuel to the fuel burning means, inlet restricting means movable within the fuel conduit means for restricting the fuel inlet orifice of the fuel conduit means, valve means within the fuel conduit means movable between a closed position in which fuel flow through the fuel conduit means is prevented and an open position in which fuel flow through the fuel conduit means is permitted, outlet cleaning means movable within the fuel conduit means with the valve means for movement into and out of the fuel outlet orifice of the fuel conduit means, a single control member movably mounted on the apparatus, and means operably connecting the control member with the valve means and the inlet restricting means for moving the valve means and the outlet cleaning means and the*

*inlet restricting means in response to movement of the control member, the control member being movable between:*

*a. a first or off position in which the connecting means maintains the valve means in the closed position and the outlet cleaning means in the fuel outlet orifice,*

*b. a second or light position in which the connecting means maintains the valve means in the open position and the outlet cleaning means out of the fuel outlet orifice and maintains the inlet restricting means in the fuel inlet orifice,*

*c. a third or high position in which the connecting means maintains the valve means in the open position and the outlet cleaning means out of the fuel outlet orifice and maintains the inlet restricting means out of the fuel inlet orifice, and*

*d. a fourth or low position in which the connecting means maintains the valve means in the open position and the outlet cleaning means in the fuel outlet orifice and maintains the inlet restricting means out of the fuel inlet orifice whereby the flow of fuel through the outlet orifice is throttled by the outlet cleaning means.*

*17. The structure of claim 16 in which the fuel burning apparatus is a camp stove and the outlet cleaning means extends at right angles to the inlet restricting means.*

* * * * *